United States Patent

[11] 3,546,384

[72] Inventor Eric Richard Brigham
Essex, England
[21] Appl. No. 761,552
[22] Filed Sept. 23, 1968
[45] Patented Dec. 8, 1970
[73] Assignee The Marconi Company Limited
London, England
a British Company
[32] Priority Nov. 6, 1967
[33] Great Britain
[31] No. 50,362/67

[54] MULTIPLEX SYNCHRONIZING SYSTEM
13 Claims, 2 Drawing Figs.

[52] U.S. Cl. .......... 179/15, 178/69.5
[51] Int. Cl. .......... H04j 3/06
[50] Field of Search .......... 179/15 (APC), 15(Sig), 15(Synch.), 15(A), 15(A Sync.), 155(Sig); 178/53, 69.5

[56] References Cited

UNITED STATES PATENTS

| | | | |
|---|---|---|---|
| 2,546,316 | 3/1951 | Peterson | 179/15(Sync)UX |
| 3,426,153 | 2/1969 | Kitsopoulis | 179/15(Sig.)UX |
| 3,463,887 | 8/1969 | Sukehiro | 178/53X |

*Primary Examiner*—Ralph D. Blakeslee
*Attorney*—Baldwin, Wight & Brown

ABSTRACT: In a multiplexing system wherein two or more combination signals which are to be multiplexed each includes a synchronising code combination which is the same for each of the code combination signals. There is provided, at the transmitter, means for inverting the synchronising code combination of one of the code combination signals prior to combining the signals for transmission, and, in one of the receiver channels, means selectively responsive to the inverted synchronising code combination.

Figure 1:
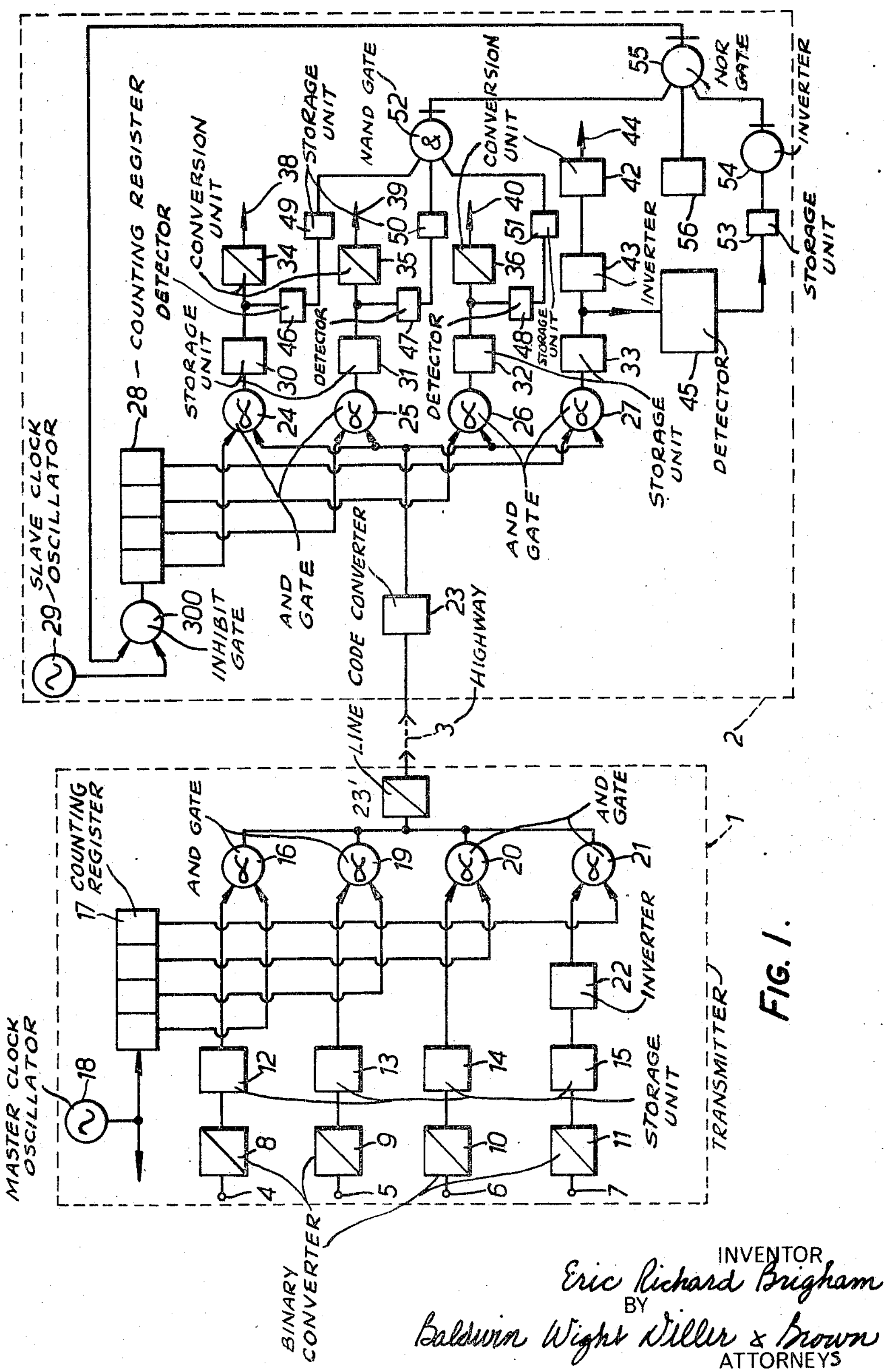

INVENTOR
Eric Richard Brigham
BY
Baldwin Wight Diller & Brown
ATTORNEYS

INVENTOR
ERIC RICHARD BRIGHAM
BY Baldwin Wight Diller & Brown
ATTORNEYS

MULTIPLEX SYNCHRONIZING SYSTEM

This invention relates to multiplexing systems and more particularly to multiplexing systems of the kind wherein two or more code combination signals which are to be multiplexed each includes a synchronising code combination which is the same for each of the code combination signals. When two or more code combination signals are to be multiplexed it is obviously necessary that the code combination signals are separated out at the receiver in the same order in which they were combined at the transmitter. The object of the present invention is to provide improved and simple means for achieving this.

According to this invention a multiplexing arrangement of the kind referred to comprises, at the transmitter, means for inverting the synchronising code combination of one of the code combination signals prior to combining the code combination signals for transmission and, in one of the receiver channels, means selectively responsive to the inverted synchronising code combination.

Preferably the means responsive to the inverted synchronising code combination are in that receiver channel which is appropriated to receive said one of the code combination signals but, as will be appreciated, this is not essential (though it is preferred) because instead of detecting the correct presence of the inverted code combination signal in the received channel which should receive it, it is possible to carry out the invention by inserting the inverted code combination responsive means in one of the other channels and using it to detect the wrongful presence of the inverted code combination there.

Preferably the inverted code combination responsive means are employed to control automatically the separating out of the code combination signals in the order in which they were combined at the transmitter.

A transmitter in accordance with the present invention accordingly includes means for inverting the synchronising code combination of one of the code combination signals prior to combining the code combination signals for transmission and a receiver in accordance with the present invention accordingly includes means, in one of its channels, selectively responsive to the inverted synchronising code combination.

Preferably the code combination signal containing the synchronising code combination which is inverted, is inverted as a whole.

Preferably again said transmitter includes a plurality of storage units, one for each signal channel to which the individual code combination signals are applied, a plurality of gates, one for each signal channel, connected to receive stored signals from said storage units and connected to apply signals passed thereby to a common signal channel, said gates being controlled to open in a predetermined sequence by a counting register which counts step by step under control of a master clock oscillator, inverter means being connected between the storage unit and the gate in the signal channel which is appropriate to said one code combination signal.

In one way of carrying out the invention said receiver includes a plurality of gates each included in a different receiving channel and each connected to receive signals from the common signal channel, said last mentioned gates being controlled to open in a predetermined sequence by a counting register which counts step by step under control of a slave clock oscillator adapted to be synchronised with the master clock oscillator in said transmitter, the receiving channel appropriate to said one code combination signal including inverter means, means for detecting the presence of said inverted code combination and means for interrupting the counting of said counting register, said last mentioned means being controlled by said inverted code combination detector in such manner that said counting is not interrupted if said last mentioned detector detects said inverted code combination.

Preferably said means for interrupting the counting of said counting register includes a gate connected in driving path between said counting register and said slave clock oscillator said last mentioned gate being arranged to be inhibited by strobing pulses from a strobe pulse source, controlled by said slave oscillator, at times other than when said inverted code combination detector detects said inverted code combination.

Preferably the pulses from said strobe pulse source are applied to said last mentioned gate through a further gate which is inhibited at times when said inverted code combination detector detects said inverted code combination.

Preferably again a noninverted synchronising code combination detector is connected to detect the presence of a noninverted synchronising code combination in at least one of the remaining signal channels, said means for interrupting the counting of said register being controlled both by said inverted code combination detector and by said noninverted code combination detector in such manner that if either detector detects the code combination said counting is not interrupted, in which case, where said means for interrupting the counting of said counting register includes a gate connected in the driving path between said counting register and said slave clock oscillator and controlled by strobe pulses passed through a further gate, said further gate is inhibited at times when said inverted code combination detector detects said inverted code combination signal and at times when said noninverted code combination detector or detectors detects or detect said noninverted code combination. Preferably storage means providing a storage time of a similar period to that between successive synchronising code combinations in the incoming signal, are interposed between said detector or detectors and said further gate.

The invention is illustrated in and described with reference to the accompanying drawings.

Referring to FIG. 1 is a block diagram of a multiplexing arrangement, including a transmitter and a receiver, incorporating the present invention.

Figure 2:
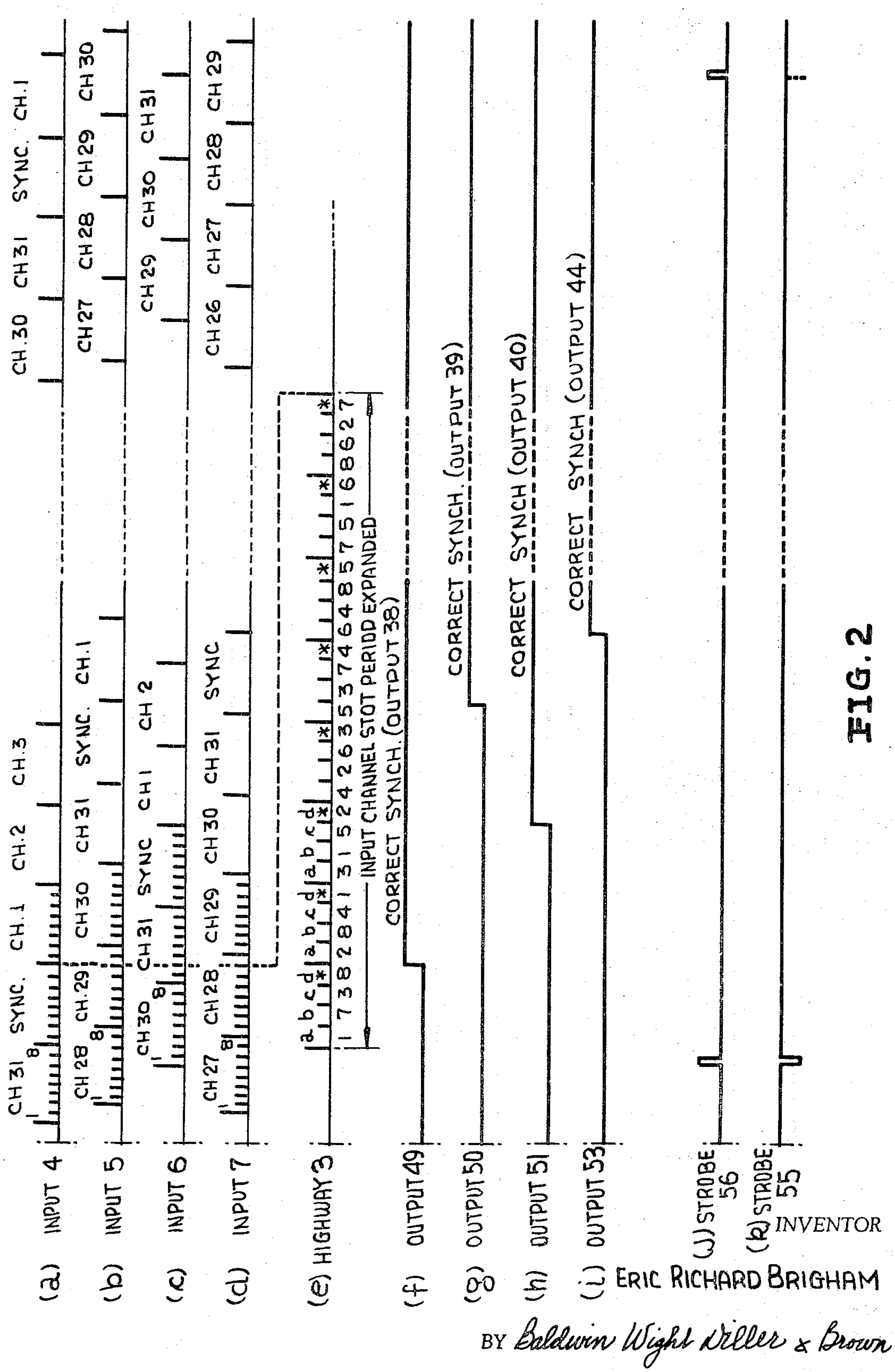

FIG. 2 is a time-signal diagram useful in explaining the operation of the multiplexing arrangement illustrated in FIG. 1.

Referring to the drawing FIG. 1 the transmitting station is represented within the block 1 and the receiving station is represented within the block 2. 3 is the common highway (which could be a cable) connecting the transmitting station 1 to the receiving station 2 and over which multiplexed P.C.M. signals are to be passed.

For convenience of illustration it is assumed that four standard P.C.M. systems are to be multiplexed. At the transmitting station 1, the four standard P.C.M. channels (not shown) are each connected to a different one of four terminals 4, 5, 6 and 7. In accordance with present day practice the bipolar signals applied to the terminals 4, 5, 6 and 7 would be at 1.536 M bits, in other words would occur at a rate of 1.536 million bits per second.

Terminals 4, 5, 6 and 7 are connected respectively to four bipolar to binary conversion units 8, 9, 10 and 11, which are as known per se. The conversion units 8, 9, 10 and 11 are connected respectively to four storage units 12, 13, 14 and 15.

Storage unit 12 is connected to one input terminal of an AND gate 16 the other input terminal of which is connected to the first stage of a counting register 17 which is driven step by step under the control of the transmitting station master clock oscillator 18. The frequency of oscillator 18, in the present example where four P.C.M. systems are to be multiplexed, is chosen to be four times the bit frequency of the P.C.M. signals. Thus in the present example, where a standard bit frequency of 1.536 M bits is employed, the frequency of oscillator 18 is 6.144 Mc/s.

Storage unit 13 is connected to one input terminal of an AND gate 19 and the other input terminal of which is connected to the second stage of counting register 17.

Storage unit 14 is connected to one input terminal of an AND gate 20 the other input terminal of which is connected to the third stage of counting register 17.

Storage unit 15 is connected to one terminal of an AND gate 21, not directly however but through and inverter circuit 22. The other input terminal of AND gate 21 is connected to the fourth and last stage of counting register 17.

The output terminals of AND gates 16, 19, 20 and 21 are connected together and, via a line code conversion unit as known per se, to the common highway 3 for transmission to the receiving station 2.

Thus it will be seen that signals at each of the terminals 4, 5, 6 and 7 are applied in turn by the action of gates 16, 19, 20 and 21 under control of the oscillator 18 and register 17 acting as a distributor. Because the signals from one of the P.C.M. systems, that connected to terminal 7 are inverted the sequence of transmitting the multiplexed signals may be recognised at the receiving station, as will be seen later.

At the receiving unit of FIG. 1 signals appearing on the common highway 3 are applied, via a line code conversion unit 23 simultaneously to the first input terminal of each of four AND gates 24, 25, 26 and 27. The second input terminal of each of gates 24, 25, 26 and 27 is connected respectively to the first, second, third and fourth stages of a counting register 28 which is driven step-by-step by a slave clock oscillator 29 synchronised with the master clock oscillator 18 at the transmitting station through an inhibit gate 300 when that gate is open. As will be seen later, inhibit gate 300 in this embodiment is normally open and accordingly the register 28 is driven by slave clock oscillator 29 to open gates 24, 25, 26 and 27 sequentially and in turn. The output terminals of gates 24, 25, 26 and 27 are connected respectively to storage units 30, 31, 32 and 33. Storage units 30, 31 and 32 are connected to binary to bipolar conversion units 34, 35 and 36, each of which is in turn connected to an output terminal 38, 39 or 40. Storage unit 31 is connected to a binary to bipolar conversion unit 42 via an inverter circuit 43, the conversion unit 42 being connected in turn to an output terminal 44.

Output signals from storage units 30, 31 and 32 are also fed respectively to synchronising code pattern detectors 46, 47 and 48. Output signals from storage unit 33 are applied to an inverted synchronising code pattern detector 45. Synchronising code pattern detectors 46, 47 and 48 are applied respectively to storage units 49, 50 and 51, each of which is adapted to provide storage for the period between successive synchronising codes. The outputs of storage units 49, 50 and 51 are applied to the input terminals of a AND gate 52 which provides a O output when correct synchronisation is detected by all of the detectors 46, 47 and 48.

Output from the inverted synchronising code pattern detector 45 is stored in a storage unit 53, which provides a similar period of storage to that provided by each of the storage units 49, 50 and 51. Output from storage unit 53 is inverted in an inverter 54, so that a O is obtained if detector 45 detects corrected synchronisation, and applied to one input terminal of a NOR gate 55. A second input terminal of NOR gate 55 is connected to the output terminal of NAND gate 52 so that when either detector 45 or the three detectors 46, 47 and 48 detect correct synchronisation NOR gate 55 is inhibited. A strobe pulse source 56, controlled by the slave clock oscillator 29, is also connected to gate 55 and the output terminal of gate 55 is connected to gate 300 so that strobe pulses are passed by gate 55, when that gate is opened, inhibit gate 300 and thus cause register 28 to miss one step. So long as detectors 46, 47 and 48 or detector 45 detect synchronisation the signals stored in stores 49, 50, 51 and 53 act to inhibit gate 55.

Whenever detectors 46, 47, 48 and 45 fail to detect synchronisation, however, the inhibit is removed from gate 55 and a strobe pulse is passed from the strobe pulse source 56 to inhibit gate 300 to cause register 28 to miss one step and thus in effect to step back one clock period relative to the incoming signal. Thus it will be seen that the register 28 in effect steps back one clock period at each strobe pulse until either detector 45 or detectors 46, 47 and 48 detect synchronisation.

The operation of FIG. 1 is further described with reference to the time-signal diagram shown in FIG. 2. Typical examples of signals produced by the four standard P.C.M. systems referred to previously are shown at lines *a*, *b*, *c* and *d* of the drawing as signals applied to input terminals 4, 5, 6 and 7. Each of the signals produced by any one of the standard P.C.M. systems contains typically 32 "subchannels" as they will be herein referred to, and are designated on FIG. 2 as CH1, CH2 ....CH31, the thirty second subchannel being used to provide synchronisation within the standard P.C.M. system and is shown as SYNCH. Each subchannel is sampled in "-words" consisting of typically 8 -bits as shown, the bit rate being 1.536 million bits per second, although words consisting of another number of bits, e.g. 10 bits could be used.

Each input P.C.M. signal is passed into its respective store 12, 13, 14, 15 and routed onto highway 3 by the counting register 17 at four times the standard bit frequency, the output from store 15 being inverted by inverter circuit 22. The multiplexed signal transmitted on highway 3 therefore consists of interleaved bits sampled from the four input P.C.M. signals, and an example of a "word" produced by this bit interleaving is shown at line *e* of FIG. 2. For the purpose of illustration the time scale of line *e* has been expanded, but the overall duration of this 32 bit word is equal to the duration of 8 bits of the input P.C.M. signal. Every fourth bit shown in line *e* is asterisked to indicate that it has been inverted by inverter circuit 22.

The lines *f*, *g*, *h* and *i* of FIG. 2 indicate when correct synchronisation of the four channels has been achieved.

The upper solid line on the drawing in each case indicates that the correct synchronisation signal (i.e. sequence of bits) has been detected by the detectors 45 to 48, and thereby has closed gate 55. This is further illustrated in lines *j* and *k* of FIG. 2. Line *j* shows the presence of a strobe pulse from source 56, and line *k* shows that whereas this strobe pulse is passed by gate 55 before correct synchronisation is achieved, after correct synchronisation has been detected gate 55 prevents further strobe pulses (shown in broken line to indicate their absence) from reaching gate 300.

I claim:

1. A multiplexing arrangement of the kind wherein two or more code combination signals which are to be multiplexed each includes a synchronising code combination which is the same for each of the code combination signals, a transmitter comprising means for inverting the synchronising code combination of one of the code combination signals prior to combining signals for transmission, and at least one receiving channel comprising means selectively responsive to the inverted synchronising code combination.

2. A multiplexing arrangement as claimed in claim 1 wherein the means responsive to the inverted synchronising code combination are in a receiver channel appropriate for receiving said one of the code combination signals.

3. A multiplexing arrangement as claimed in claim 1 wherein the means selectively responsive to the inverted synchronising code combination are employed to control atuomatically the separating out of the code combination signals in the order in which they were combined at the transmitter.

4. A multiplexing arrangement as claimed in claim 1 including means for inverting as a whole the one code combination signal containing the synchronising code combination to be inverted.

5. A multiplexing arrangement as claimed in claim 1 wherein said transmitter includes a plurality of storage units, one for each signal channel to which the individual code combination signals are applied, a plurality of gates, one for each signal channel, connected to receive stored signals from said storage units and connected to apply signals passed thereby to a common signal channel, said gates being controlled to open in a predetermined sequence by a counting register which counts step by step under control of a master clock oscillator, and inverter means connected between the storage unit and the gate in the signal channel which is appropriate to said one code combination signal.

6. A multiplexing arrangement as claimed in claim 1 wherein said at least one receiving channel is in a receiver which includes a plurality of gates each included in a different receiving channel and each connected to receive signals from a common signal channel, said last mentioned gates being controlled to open in a predetermined sequence by a counting register which counts step by step under control of a slave clock oscillator adapted to be synchronised with a master clock oscillator in said transmitter, the at least one receiving channel being appropriate to said one code combination signal and including inverter means, means for detecting the presence of said inverted code combination and means for interrupting the counting of said counting register, said last mentioned means being controlled by said inverted code combination detector in such manner that said counting is not interrupted if said last mentioned detector detects said inverted code combination.

7. A multiplexing arrangement as claimed in claim 6 wherein said means for interrupting the counting of said counting register includes a gate connected in driving path between said counting register and said slave clock oscillator, said last mentioned gate being arranged to be inhibited by strobing pulses from a strobe pulse source, controlled by said slave oscillator, at times other than when said inverted code combination detector detects said inverted code combination.

8. A multiplexing arrangement as claimed in claim 7 wherein the pulses from said strobe pulse source are applied to said last mentioned gate through a further gate which is inhibited at times when said inverted code combination detector detects said inverted code combination.

9. A multiplexing arrangement as claimed in claim 8 wherein a noninverted synchronising code combination detector is connected to detect the presence of a noninverted synchronising code combination in at least one of the receiving channels other than said at least one receiving channel, said means for interrupting the counting of said register being controlled both by said inverted code combination detector and by said noninverted code combination detector in such manner that if either detector detects the code combination said counting is not interrupted.

10. A multiplexing arrangement as claimed in claim 9 wherein said further gate is inhibited at times when said inverted code combination detector detects said inverted code combination signal and at times when said noninverted code combination detector or detectors detects or detect said noninverted code combination.

11. A multiplexing arrangement as claimed in claim 6 wherein storage means providing a storage time of a similar period to that between successive synchronising code combinations in the incoming signal, are interposed between said detector or detectors and said further gate.

12. A multiplexing transmitter of the kind for transmitting two or more code combination signals which are to be multiplexed wherein each includes a synchronising code combination which is the same for each of the code combination signals, comprising means for providing said two or more code combination signals, and means for inverting the synchronising code combination of one of the code combination signals prior to combining signals for transmission.

13. A multiplexed receiver of the kind wherein two or more code combination signals which are multiplexed each includes a synchronising code combination which is the same for each of the code combination signals, one of the code combinations being inverted comprising means for receiving said two or more code combination signals, and at least one receiving channel comprising means selectively responsive to the inverted synchronising code combination.